Dec. 29, 1970   T. BAUN   3,550,275
IMPLEMENT HANDLE
Filed Feb. 12, 1968

INVENTOR.
THEADORE BAUN

BY Douglas S Johnson.
Attorney

United States Patent Office 3,550,275
Patented Dec. 29, 1970

3,550,275
IMPLEMENT HANDLE
Theadore Baun, 4 Redland Crescent W.,
Scarborough, Ontario, Canada
Filed Feb. 12, 1968, Ser. No. 704,833
Int. Cl. B26b 5/00
U.S. Cl. 30—339                                    6 Claims

ABSTRACT OF THE DISCLOSURE

The implement handle in which various implements, such as knife blades or tools, may be inserted; the handle includes a folded implement retainer portion in which a slot is formed in one side and pin in the other side so as to project into the slot; the implement to be fitted into the handle has as its butt end a hole formed therein so as to fit over the pin and be swingably engaged within the retainer portion.

FIELD OF THE INVENTION

This application relates to an implement handle, and in particular, an implement handle of simple construction in which there can be inserted various implements such as knife blades, other cutlery devices such as forks and spoons, and simple tools such as a screw driver bit.

The implement handle of this invention is suitable, when made of the proper material, for example, stainless steel, for use as a handle for surgical knives. In any event, the implement handle of this invention is one which provides sufficient rigidity to permit the use of implements such as a knife blade under rigorous conditions.

It is a purpose of the implement handle of this invention to provide a handle wherein various knife blades can be inserted. This is of particular importance to such fields as the butchering trade, to game hunters and fishermen, and to campers and picnicers. The implement handle may also be of utility to the handyman when the proper implement is placed in the handle. As indicated, the handle may also be of value to the surgeon, in that replaceable, lower cost surgical blades be inserted in the handle, so that the same handle may be used during surgical procedure for several purposes with several different blades.

DESCRIPTION OF THE PRIOR ART

In many of the devices heretofore produced in which a working end of an implement such as a knife or screw driver etc. is placed in a handle, it has been necessary to tighten or loosen various holding devices on the handle so as to permit entry and exit of the implement device therefrom. In other devices, the implement device (usually a knife blade) has been inserted in to a slot, or over a pin, or both, so as to have interfitting pieces in the same manner as two pieces from a jig-saw puzzle, but any such device has been unable to withstand lateral pressure placed against the side of the implement. In still other devices, it has been necessary to disassemble a two piece handle and to insert the implement device over pins or other retaining means and then to reassemble the handle.

SUMMARY OF THE INVENTION

The retainer portion of the implement handle of this invention, being that portion of the handle in which the implement fits, comprises a folded piece of metal formed in a generally U-shaped cross-sectional configuration so that the folds of the metal (being the legs of the U) are spaced one from the other, and having a slot cut into one of the folds and a pin formed in the other so as to project into the slot. There are certain critical dimensional relationships with respect to the spacing of the pin and the slot, and of the implement which is placed in the retainer portion of the handle, as will appear hereinafter.

Any implement intended for placing in the implement handle of this invention is so designed as to have the butt end thereof (being the end opposite the working end) a substantially flat body portion having a hole placed therein which co-operates with the pin projecting into the slot of the retainer portion of the handle in a manner as will be fully discussed hereinafter.

It is an object of this invention to provide an implement handle wherein the implement can be readily and easily inserted with minimum effort and movement.

It is a further object of this invention to provide an implement handle which can be readily and easily formed, in which various implement devices can be easily inserted and replaced; and in which the implement device, when inserted, is rigidly held in place.

BRIEF DESCRIPTION OF THE DRAWING

These and other objects and purposes of this invention will be more fully discussed below in association with the drawings, in which.

DESCRIPTION OF THE PREFERRED EMBODIMENTS

Figure 1:
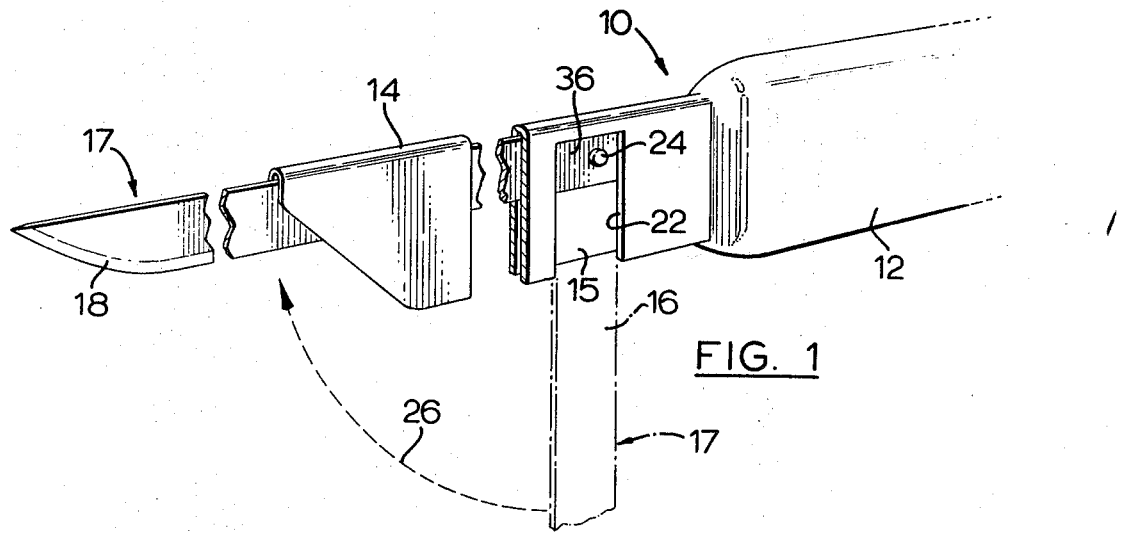
FIG. 1 is a perspective view of a handle having a knife blade inserted therein and showing the manner in which the blade is positioned in the handle.

The implement handle is shown generally at 10, and comprises a grasping portion 12 which is suitably dimensioned so as to be grasped easily in the hand, and a retainer portion 14 into which the implement is inserted. The grasping portion 12 and the retainer portion 14 of the implement handle 10 are rigidly and coaxially secured one to the other so as to form a useful device. The grasping portion 12 and retainer portion 14 may be formed of the same material, and the same stock, or may be different materials as will appear hereinafter. The length of retainer portion 14 is immaterial, and may vary with the general intended use for the implement handle; that is to say, the length of the retainer portion 14 of the handle may be different in one intended for use by butchers than in one intended for use by surgeons, as will appear more evident hereinafter.

The retainer portion 14 of the handle 10 is that portion into which the implement device 17 is inserted. Generally, the retainer portion 14 comprises a folded piece of metal which is formed in a generally U-shaped cross-sectional configuration, having a slot 22 formed in one side thereof and a pin 24 in the other side so as to project into the slot.

Figure 5:
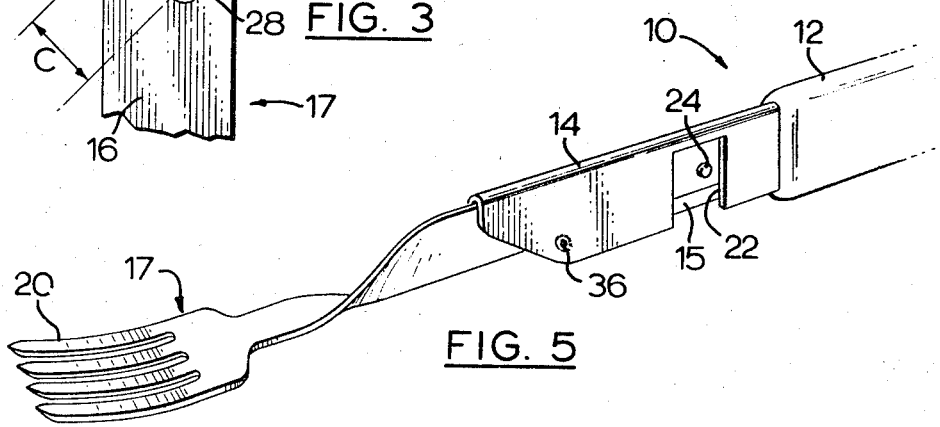
FIG. 5 is a perspective view of the implement handle showing a fork placed therein, and showing a further embodiment of the implement handle of this invention.

The implement which is placed in retainer portion 14 of handle 10 is illustrated generally at 17, and in FIG. 1 is shown as a knife blade 18. The fork 20 illustrated in FIG. 5 is indicative of the other types of implement devices which may be placed in handle 10. As appears in FIG. 1, to place the implement device 17 in the handle 10, the butt end 16 of the device 17 is placed into slot 22 and over pin 24 which projects into slot 22. The implement 17 is then swung forwardly and upwards as indicated by the dotted arrow 26 in FIG. 1 until it assumes the position indicated by knife blade 18 or fork 20 in FIGS. 1 and 5 respectively.

Figures 4, 4A:
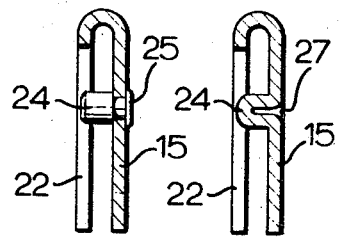
FIGS. 4 and 4a are cross-sectional views of the retainer portion of the handle taken through the slot along lines 4—4 shown in FIG. 2.

FIGS. 4 and 4a illustrate two ways in which the pin 24 may be formed in the solid side 15 of retainer portion 14 of the handle 10. In FIG. 4, there is shown a rivet 25 which is placed through side 15 so as to form the pin 24 in slot 22. In FIG. 4a, the metal of side 15 is upset as shown at 27 so as to form the pin 24. The precise manner in which the pin 24 is formed is immaterial, provided it is correctly positioned and is of the proper diameter as is discussed hereinafter.

In order for the implement device 17 to fit into the retainer portion 14 of handle 10, and to be held securely therein, it is necessary that certain dimensional relationships between the handle and the implement are met. Other dimensional relationships are not as critical; and all are discussed below. In any event, in order for implement 17 to be placed into slot 22 and over the pin 24 so that it may be swung up into place to provide a working and useful device, it is necessary first of all that the width of the butt end 16 of implement device 17 to not be greater than and usually less than the width of slot 22. In addition, the diameter of the hole 28 which is in the butt end 16 of the implement device 17 must be equal to or very slightly greater than the diameter of pin 24. If the diameter of hole 28 is much greater than the diameter of pin 24, the likelihood of a sloppy and less rigid fit of the implement 17 into the handle 10 is increased. The thickness of the butt end portion 16 must also not be greater than the spacing between the two legs of the U formed in the cross-section of retainer portion 14.

Figure 2:
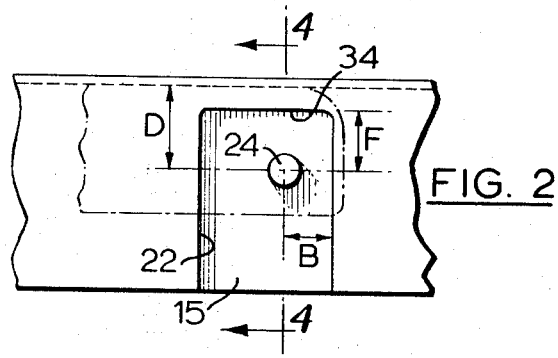
FIG. 2 is a partial side view of the retainer portion of the handle having an implement shown in place therein in ghosted lines.

Further, in order that the implement 17 be such that it may fit into the retainer portion 14 of handle 10, be swung into place, and be rigidly held therein, it is necessary that the dimension from the extreme end 30 of the butt end 16 to the centre of hole 28 (as indicated at A in FIG. 3) be greater than the dimension from the rearward edge of slot 22 to the centre of pin 24 (as indicated at B in FIG. 2). Still further, in order that the implement 17 may swing up into its final position, it is necessary that the longest dimension from the centre of the hole 28 formed in the butt end 16 of the implement to the upper and rearward corner 32 of the butt end 16 (as indicated at C in FIG. 3) be equal to or less than the dimension from the centre of pin 24 to the inner surface at the fold formed in retainer portion 14 (as indicated at D in FIG. 2).

In summary, then, it is clear that the following dimensional relationships must be met for any implement device 17 to fit into the retainer portion 14 of handle 10:

(a) For at least the butt end portion 16 of the implement 17, the length of that butt end portion being approximately equal to the length of retainer portion 14 of implement handle 10, the width of the butt end 16 must be equal to or less than the width of slot 22.

Figure 3:
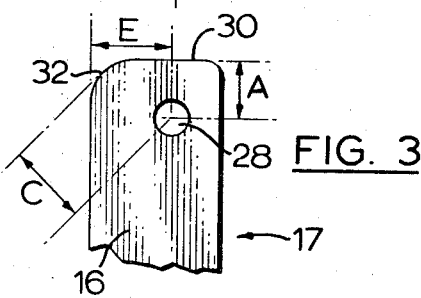
FIG. 3 is a partial view of the end of an implement to be placed into the handle (FIGS. 2 and 3 showing the relationships of various dimensional characteristics and requirements between the handle and the implement to be placed therein)

(b) Dimension A illustrated in FIG. 3 must be greater than dimension B illustrated in FIG. 2.

(c) Dimension C illustrated in FIG. 3 must be equal to or less than dimension D, illustrated in FIG. 2.

(d) The diameter of hole 28 must be equal to or slightly greater than the diameter of pin 24.

(e) The thickness of the butt end portion 16 of the implement 17 which fits within retainer portion 14 of the handle 10 must be equal to or slightly less than the spacing between the two legs of the U formed by the folded metal comprising the retainer portion 14.

In addition, the following dimensional characteristics are indicative of the usual case, but are not quite so critical. As will be evident, the preceding dimensional characteristics discussed above must be met in order that the implement device 17 will fit into and be retained by the retainer portion 14 of handle 10. However, the dimensional characteristics discussed below are such that various dimensioning and manufacturing tolerances and inaccuracies etc., and design choice and economy, may dictate the strict adherance to them in a manner so as not to preclude the critical dimensional relationships discussed above. As indicated, these are the usual cases and are as illustrated in the drawings:

(a) The distance from the centre of hole 28 to the upper edge of the butt end 16 of the implement device 17 (indicated at E in FIG. 3) is greater than the distance from the centre of pin 24 to the upper edge 34 of slot 22 (indicated at F in FIG. 2).

(b) In order that the butt end 16 of the implement device 17 may be easily inserted into the slot 22 without having to first assure that the extreme end 30 thereof is inserted into the space between the legs of the retainer portion 14 above top 34 of slot 22, it is usual that dimension A illustrated in FIG. 3 be approximately equal to or slightly less than dimension F illustrated in FIG. 2 so that the butt end 16 may easily slip over pin 24 as the pin enters hole 28.

With respect to the relationship of dimensions E and F shown in FIGS. 3 and 2 respectively, it is clear from the geometry of the butt end 16 of the implement device 17 that dimension E must be less than dimension C; and it is evident therefor that when dimension E is greater than dimension F, the butt end 16 is more securely fitted within the retainer portion 14 of the implement handle 10 of this invention. It is also clear that because the dimension A illustrated in FIG. 3 is greater than the dimension B illustrated in FIG. 2, and because a substantial portion of the overall length of implement 17 (usually not less than 25%) is maintained within the retainer portion 14 of the handle 10, the retention of implement 17 within the retainer portion 14 is secure and rigid. Also, it is evident that in order to replace the implement 17 with another, it is a simple matter to swing the implement down so that the butt end 16 aligns with the slot 22, then to lift the implement out of the slot 22 and over pin 24; and to reverse the procedure in order to insert a new implement device 17 in handle 10. It thus becomes clear that the implement handle of this invention is of significant utility to such classes of users as surgeons, butchers, hunters, etc. obviously, depending on the physical effort required for the task to be performed, the overall size of the handle 10 and the retainer portion 14 thereof may be larger or smaller; smaller say for the use of a surgeon and larger for use by a game hunter.

FIG. 5 shows a further improvement to the handle 10 of the present invention so as to more rigidly and securely hold the implement 17 in retainer portion 14. A dimple 36 is formed inwardly in one side of the retainer portion 14 in a position below where the butt end 16 of the implement 17 will lie when fully in place. The dimple 36 helps to retain the implement 17 within the retainer portion 14 of the handle 10 so that it may resist pressure downwardly in a direction from the folded edge of the retainer portion 14. Obviously, in order to disengage the implement from the handle, it is necessary to force the implement 17 down past dimple 36 with sufficient force as to overcome the retaining tendency of the dimple against the implement.

The retainer portion 14 of the handle 10 may be formed so that the slot 22 is in either side of the folded metal, with the pin 24 projecting into the slot 22 from the other side. Further, the grasping portion 12 of the handle may be covered with plastic, wood or other suitable material; or the retainer portion 14 may be rigidly embedded in another material such as plastic which forms the grasping portion 12 of the handle 10.

By suitably dimensioning the butt end 16 thereof, other implement devices 17 such as screw driver bits, chisel heads, saw blades and fixed or box wrenches etc. may be fitted into an implement handle 10 so as to be useful to the handyman or mechanic. Also, as mentioned above, an implement handle 10 may be produced in such material as stainless steel so that it may withstand sterilization procedures and be useful to the surgeon. Still other implement handles with the retainer portion 14 firmly fitted in wood, bone or plastic may be useful to the butcher; and still others to the game hunter etc.

By forming a retainer portion at each end of a central (grasping) portion, the retainer portions facing in opposite directions when viewed from one side, and by suitably dimensioning the central portion, an excellent blade for a rotary lawn mower can be achieved.

The embodiments of the invention in which an exclusive property or privilege is claimed are defined as follows:

1. An implement handle comprising: a grasping portion suitably dimensioned so as to be easily grasped by the hand; an implement retainer portion rigidly and co-axially secured to said grasping portion; said retainer portion having a generally U-shaped cross-sectional configuration with two spaced apart sides forming the legs of the U and a cross-portion joining said two spaced apart sides; one of said sides having a slot formed therein, said slot having frontward, rearward and upper edges, and the other of said sides having a pin formed therein so as to project into said slot; and an implement adapted to be retained by said retainer portion, wherein: said implement has a butt end portion having upper, lower and rearmost edges; the width of said butt end portion being not greater than the width of said slot formed in one side of said retainer portion; the thickness of said butt end portion being not greater than the spacing between said two spaced apart sides of said retainer portion; said butt end having a hole formed therein; the diameter of said hole being at least equal to the diameter of said pin projecting into said slot; the distance from the centre of said hole to the rearmost edge of said butt end portion being greater than the distance from the centre of said pin to the rearward edge of said slot; and the greatest distance from the centre of said hole rearwardly and upwardly to an edge of said butt end portion being not greater than the distance from the centre of said pin to the inner side of said cross portion joining said two spaced apart sides of said retainer portion.

2. The implement as claimed in claim 1, wherein, the distance from the centre of said hole to the upper edge of said butt end portion is greater than the distance from the centre of said pin to the upper edge of said slot.

3. The implement as claimed in 2 wherein, the distance from the centre of said hole to the rearmost edge of said butt end portion is not greater than the distance from the centre of said pin to the upper edge of said slot.

4. The implement handle of claim 1 wherein said grasping portion and said retainer portion are formed of the same material.

5. The implement handle of claim 1 wherein said grasping portion is formed of one of the group consisting of plastic, wood, metal or bone.

6. The implement handle of claim 1 wherein a dimple is formed inwardly on at least one of said two spaced apart sides of said retainer portion in a position proximate the lower edge thereof.

References Cited

UNITED STATES PATENTS

| | | | |
|---|---|---|---|
| 2,245,096 | 6/1941 | Penney | 30—339 |
| 3,185,193 | 5/1965 | Orr | 30—329X |
| 1,533,971 | 4/1925 | Castracane | 30—339 |

ROBERT C. RIORDON, Primary Examiner

J. C. PETERS, Assistant Examiner